Sept. 20, 1938.　　　J. H. CHATTIN ET AL　　　2,130,980
FRUIT PEELING MACHINE
Filed Oct. 29, 1937　　　2 Sheets-Sheet 1

Inventors
Jewel H. Chattin,
James G. Clements,
By Stanley Burch
Attorney

Patented Sept. 20, 1938

2,130,980

UNITED STATES PATENT OFFICE 2,130,980

FRUIT PEELING MACHINE

Jewel H. Chattin and James G. Clements, Tampa, Fla., assignors of one-fifth to William E. Thompson, Hillsborough County, Fla.

Application October 29, 1937, Serial No. 171,763

3 Claims. (Cl. 146—43)

This invention relates to improvements in fruit peeling machines, and an object of the invention is to provide an improved machine of this character which is of simple and durable construction and efficient in operation, and which will expeditiously remove the peel from the fruit without injury to the latter.

A further important object of the present invention is to provide an improved machine of the above character including a peeling cutter, and other cutters operating in advance of and at opposite sides of said peeling cutter for cutting through the peeling in parallel lines so as to define the width of peel removed by the peeling cutter and to insure ready and efficient operation of the peeling cutter in removing a peeling of uniform width.

A further object is to provide an improved machine of this character including a cutter carriage adapted to be swung in one direction during the peeling operation, a sliding cutter head carried by said carriage and spring pressed in one direction for causing the cutter to follow the contour of the fruit being peeled, means to automatically retract the cutter head away from the fruit upon completion of the peeling operation, means to automatically secure the cutter head in such retracted position, means to swing the carriage in the opposite direction at the completion of a peeling operation so as to return the cutter to a position for starting a new peeling operation, and means to automatically release the cutter head upon return of the carriage to starting position for permitting engagement of the cutter with the fruit to be peeled during the next peeling operation.

With the above general objects in view, and others that will become apparent as the nature of the invention is better understood, such invention consists in the novel form, combination and arrangement of parts hereinafter more fully described, shown in the accompanying drawings and claimed.

Figure 1:
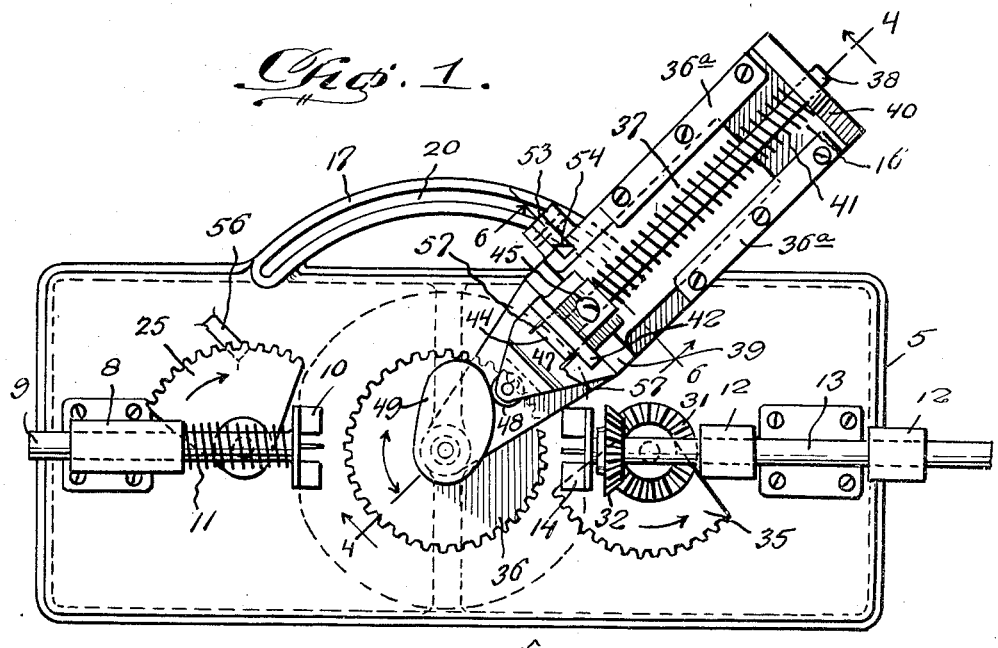
Figure 1 is a top plan view of a fruit peeling machine constructed in accordance with the present invention.

Referring in detail to the drawings, the illustrated embodiment of the present invention includes a supporting base of hollow inverted pan-shape, and rigidly mounted upon such base at opposite ends thereof are standards 6 and 7. The standard 6 is provided at the top with a bearing 8 in which is rotatably and slidably mounted a shaft 9 provided on its inner end with a circular series of radially arranged blades 10 adapted to impale one end of the fruit to be peeled. A spring 11 encircles the shaft 9 between the bearing 8 and the mounting of blades 10 so as to yieldingly urge the shaft 9 inwardly and cause penetration of the blades 10 into the fruit while being maintained in engagement therewith. The standard 6 is provided at the top with spaced bearings 12 in which is journaled a drive shaft 13 provided upon its inner end with a circular series of radially arranged blades 14 adapted to impale the opposite end of the fruit to be peeled. As shafts 9 and 13 are in axial alinement but spaced apart, it will be seen that the fruit may be readily arranged between said shafts and impaled at its opposite end by the blades 10 and 14 so as to be effectively supported, as well as rotated upon driving shaft 13. Any suitable means may be provided for imparting rotation to shaft 13.

Journaled in the top of base 5 intermediate its ends is a vertical tubular shaft 15 upon the upper end of which is secured the inner end of an arm 16 constituting a swinging cutter carriage whose weight is partially sustained by an arcuate slotted member 17 carried by the base 5 at the rear of the latter, the carriage 16 having a depending boss 18 intermediate its ends slidably resting upon the arcuate member 17 and carrying a bolt 19 extending freely through the slot 20 of arcuate member 17. A nut 21 may be threaded on the lower end of bolt 19 so as to relieve the carriage 16 of any upward strains while permitting free swinging movement of the carriage about an axis concentric with shaft 15.

The standard 6 is also provided with an inwardly projecting arm 22 near its lower end, and this arm has a bearing 23 at its inner end in which is journaled the upper end of a vertical shaft 24 also journaled in and extending through the top of base 5. A segment gear 25 is secured on shaft 24 between arm 22 and the top of base 5, while a bevel gear 26 is secured on the lower end of said shaft 24 with another bevel gear 27 carried by a horizontal shaft 28 extending longitudinally of and journaled in the ends of base 5.

Standard 6 is provided near the top and inwardly of bearings 12 with a vertical bearing 29 in which is journaled the upper portion of a vertical shaft 30 that is also journaled in and extends through the top of base 5. A bevel gear 31 is secured on the upper end of shaft 30 and meshes with another bevel gear 32 secured on shaft 13, another bevel gear 33 being secured on the lower end of shaft 30 and meshing with still another bevel gear 34 secured on shaft 28. It will thus be seen that when shaft 13 is rotated to rotate the fruit impaled and supported by blades 10 and 14, shafts 30 and 28 will be rotated through the gearing described, thereby rotating segment gear 25 and another segment gear 35 secured on shaft 30 just above the base 5. It will be seen that segment gears 25 and 35 are arranged at opposite sides of a relatively large spur gear 36 secured on tubular shaft 15 between carriage 16 and the top of base 5. The arrangement is such that segment gear 35 will mesh with spur gear 36 so as to rotate shaft 15 and swing carriage 16 in a clockwise direction during the peeling operation, after which segment gear 35 will disengage from spur gear 36 and allow carriage 16 to remain still for a short time, after which segment gear 25 will engage spur gear 36 and rotate shaft 15 for swinging cutter carriage 16 in the opposite direction back to a position wherein the peeling operation starts. When carriage 16 is returned to this position segment gear 25 disengages from spur gear 36 and, after a short interval of time, segment gear 35 again engages spur gear 36 for repeating the swinging of carriage 16 in a clockwise direction for the next peeling operation.

The carriage 16 is provided at opposite sides with guide flanges 36a forming a guideway in which is arranged a horizontal member 37 of a cutter head, whereby said cutter head is mounted for sliding movement longitudinally of carriage 16 and radially of shaft 15 toward and away from the fruit to be peeled when the latter is supported by the blades 10 and 14. The cutter head has a rod arranged longitudinally above its member 37 as at 38, the inner end of rod 38 being attached to an upstanding member 39 of the cutter head and the outer end of rod 38 slidably extending through an upstanding member 40 rigid with the outer end of carriage 16. A spring 41 encircles rod 38 between members 39 and 40 so as to yieldingly urge the cutter head inwardly toward the fruit and to cause the cutters of the cutter head, which will presently be described, to follow the contour of the fruit being peeled.

Figures 4, 5:
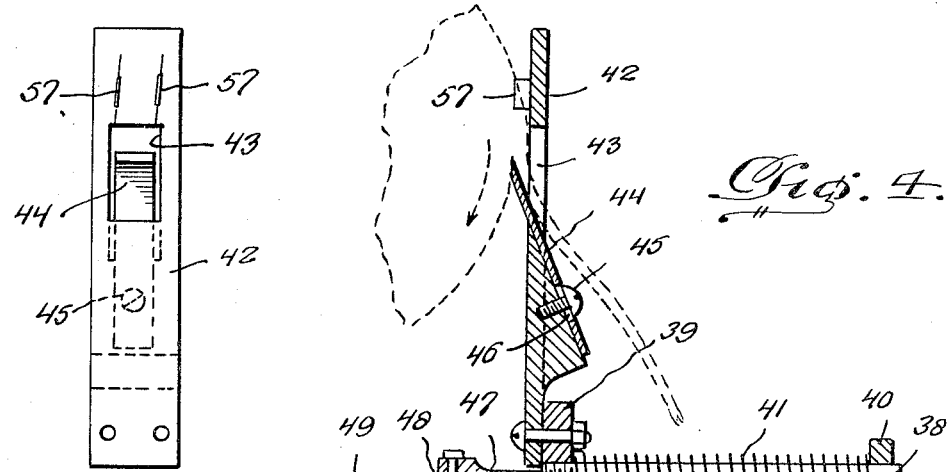
Figure 4 is a fragmentary vertical section on line 4—4 of Figure 1.
Figure 5 is an elevational view of the knife carrying member of the cutter head.

The cutter head also includes a knife carrying plate 42 rigidly attached at its lower end to the upstanding member 39 and provided near its upper end portion with a slot 43 through which extends a peeling blade 44. The blade 44 is adjustably mounted at an upward and inward inclination with its upper sharpened end projecting through slot 43 at the inner side of plate 42. The adjustable mounting of blade 42 may consist of a securing screw 45 passing through an elongated slot 46 of said blade and threaded into plate 42 below slot 43 and at the outer side of plate 42. Obviously, the upper sharpened end of blade 42 may be adjusted to project the proper distance beyond the inner face of plate 42 for removing a peel of the required thickness. Also, the portion of slot 43 above blade 44 provides sufficient clearance for passage of the peeling therethrough as it is removed. As shown in Figure 4, the fruit is rotated in a clockwise direction or toward the upper end of the blade 44 as viewed from the right hand end of the machine.

Figure 6:
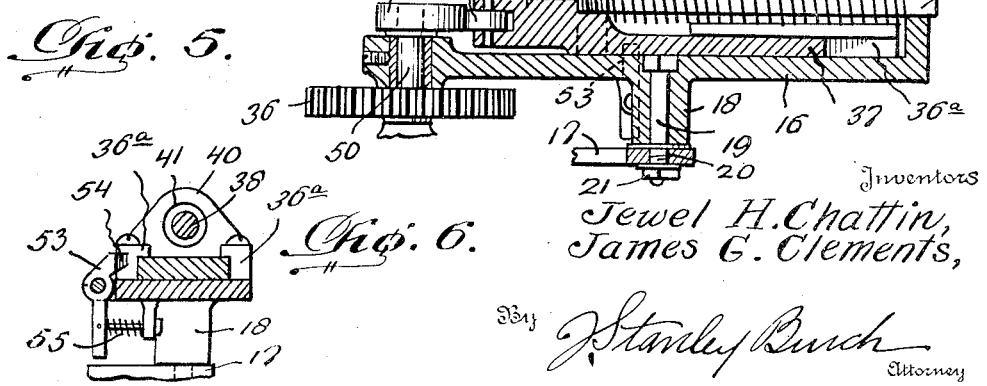
Figure 6 is a fragmentary section on line 6—6 of Figure 1.
Figure 2:
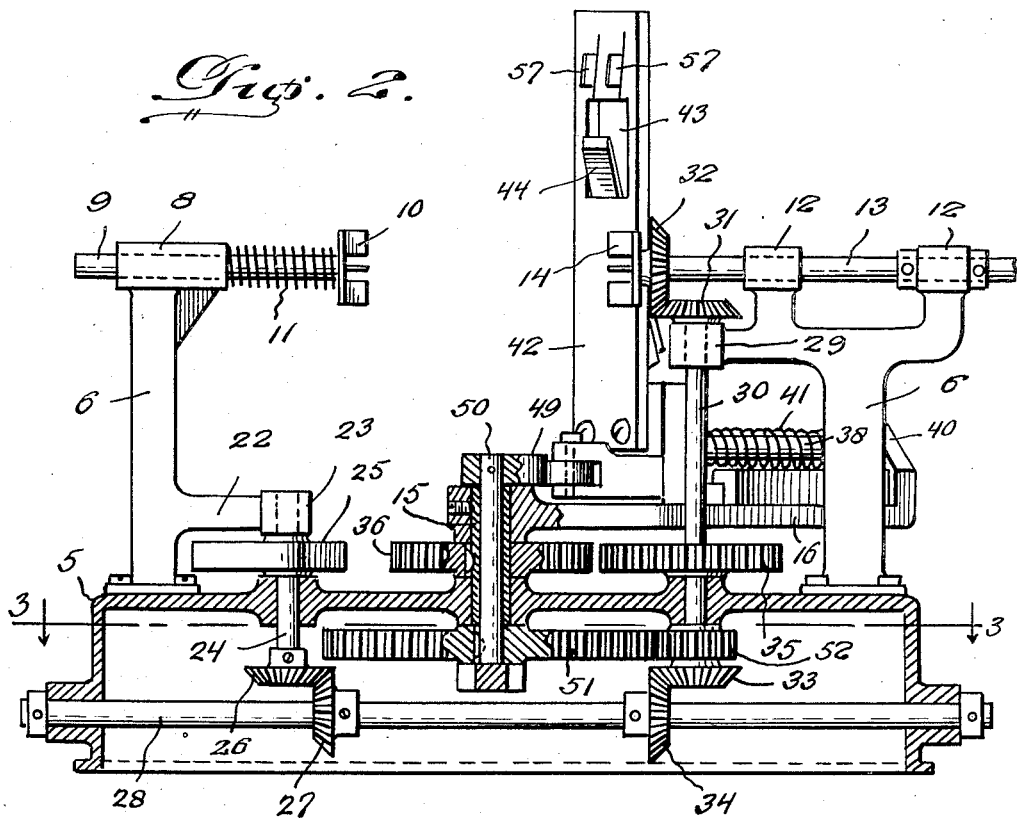
Figure 2 is a view thereof partly in front elevation and partly in vertical section.
Figure 3:
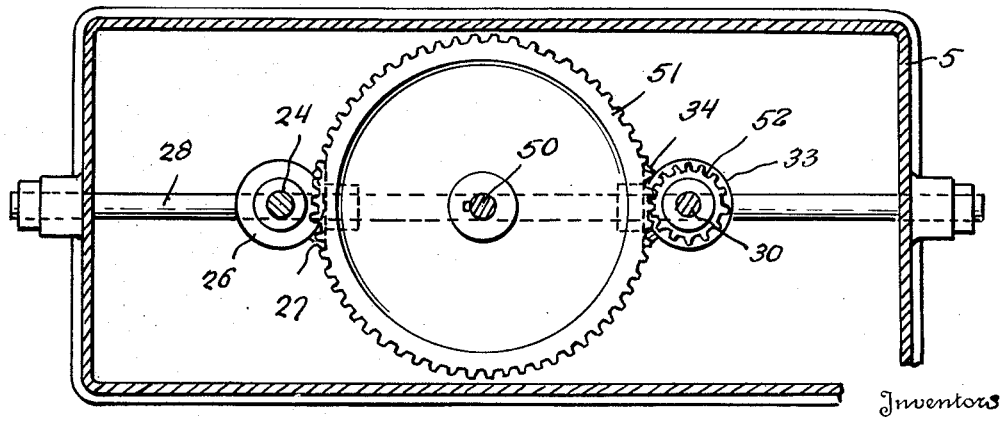
Figure 3 is a horizontal section on line 3—3 of Figure 2.

The cutter head is provided with an inwardly projecting arm 47 at the inner end of its member 37, such arm having a roller 48 engaging the periphery of a cam 49 secured on the upper end of a vertical shaft 50 journaled in and extending through tubular shaft 15. A relatively large spur gear 51 is secured on the lower end of shaft 50 beneath the top of base 5, and such gear 51 meshes with a spur pinion 52 secured on shaft 30. The arrangement is such that after segment gear 35 has swung the carriage 16 to its extreme left hand position where the peeling operation has been completed, and segment gear 35 has disengaged from gear 36, the cam 49 will actuate the cutter head against the action of spring 41 so as to force said cutter head outwardly and disengage the cutter 44 from the fruit, thereby permitting ready removal of the fruit and insertion of the next fruit to be peeled. This occurs before segment gear 25 moves into engagement with gear 35 for returning the carriage to its extreme left hand position for the start of the next peeling operation, and means is provided to automatically latch the carriage in its outwardly moved retracted position. Such latching means consists of a pivoted catch 53 mounted on one side of the carriage 16 as shown more clearly in Figures 1 and 6 and arranged to engage behind the member 39 of the cutter head at one side of the latter when said cutter head is retracted. The member 39 is permitted to pass outwardly of catch 53 by providing the latter with a bevel nose as at 54, and catch 53 is yieldingly urged to latching position by spring means as at 55. Also, provision is made for automatically releasing catch 53 and permitting the cutter head to move inwardly under the action of spring 41 for engagement of knife 43 with the fruit to be peeled as soon as the carriage returns to its extreme left hand position for the start of a new peeling operation. For this purpose, the base 5 has an upstanding lug 56 arranged in the path of the depending end of catch 53 so as to cause swinging of the latter against the action of spring 55 in a direction to disengage catch 53 from the member 39 of the cutter head upon completion of the swinging movement of carriage 16 to its starting position.

As shown more clearly in Figures 1 to 5 inclusive, a pair of spaced parallel cutter blades 57 are mounted on the plate 42 of the cutter head directly above peeling cutter 44 and slot 43. These cutters 57 are arranged directly at opposite sides of blade 44, but slightly inclined. Thus, cutter blades 57 will operate in advance of peeling cutter 44 so as to cut through the peeling in spaced but adjacent parallel lines for defining the width of the peeling removed by the cutter 44. The angle at which the blades 57 are set correspond to the general direction of the spiral line of the peeling being removed. It will be seen that the blades 57, functioning as described above, enable the peeling cutter 44 to travel in a uniform arc around the fruit, without exerting too much pressure against the flat side of the peel not removed, thus preventing tearing of the peeling, congesting of the knife 44, or the leaving of ragged edges where the peeling is removed.

In operation, the fruit is rotated upon driving shaft 13, and carriage 16 is swung slowly to the right by engagement of segment gear 35 with spur gear 36. A strip spiral peeling is thus removed from the fruit when the carriage reaches its right hand position as shown in Figure 1, whereupon cam 49 shifts the cutter head outwardly and catch 53 releasably holds said cutter head in its outwardly shifted position. Segment gear 25 then drives spur gear 36 for swinging the carriage 16 to the left back to the start of the peeling operation, catch 53 being released by lug 56 upon completing the swinging movement of carriage 16 to the left. Naturally, when catch 53 is released the next fruit to be peeled will have been positioned so that the knife 44 will engage the fruit when the cutter head is again shifted inwardly by spring 41. When segment gear 35 again engages spur gear 36 carriage 16 is again swung to the right for carrying out the next peeling operation, and this cycle of operation is repeated each time a new fruit is peeled. It will be seen that the present invention provides a very efficient machine capable of meeting with all of the requirement for a successful commercial use. Obviously, minor changes in details of construction illustrated and described may be resorted to without departing from the spirit and scope of the invention as claimed.

What we claim as new is:

1. A peeling machine including means for holding the article to be peeled, a swinging carriage, means for rotating the article, means for automatically swinging the carriage back and forth with an interval of rest between the arrival of the carriage to its extreme position in one direction and movement of the carriage in the opposite direction, a cutter mounted on the carriage and movable therewith, yieldable means urging the cutter toward the article, positively driven means acting against said yieldable means to automatically shift the cutter away from the article during said period of rest, means to automatically releasably latch the cutter in such shifted position, and means to automatically release the latching means upon approach of the carriage to its extreme position in the other direction.

2. In a fruit peeling machine, means for holding and rotating the fruit, an oscillating carriage, a sliding cutter head carried by said carriage, yieldable means sliding said cutter head toward the fruit, means to automatically oscillate said carriage with a period of rest between movement of the carriage in one direction and movement of the carriage in the opposite direction, positively driven means acting against said yieldable means to automatically slide the cutter head to a position away from the fruit during said period of rest, means to automatically latch the cutter head in said position away from the fruit, and means to automatically release the cutter head and permit its return toward the fruit upon completion of movement of the carriage in said other direction.

3. A peeling machine including means for holding the article, an oscillating carriage, means for rotating the article, a cutter head slidable on the carriage toward and away from the article, yieldable means sliding the cutter head toward the article, means for automatically oscillating the carriage with a period of rest between the movement of the carriage for the peeling operation and return of the carriage for the start of a new peeling operation, positively driven means acting against said yieldable means to automatically slide the cutter head away from the article during such period of rest, means to automatically latch the cutter head in said position away from the article, and means to automatically release the latching means and permit return of the cutter head toward the article during completion of the return movement of the carriage to the starting position, the means for oscillating the carriage including a driven gear connected with the carriage, segment gears arranged at opposite sides of said driven gear and alternately engageable with the latter for driving the same, and means for driving said segment gears.

JEWEL H. CHATTIN.
JAMES G. CLEMENTS.